March 24, 1953        G. J. WHITTEY        2,632,262

HYDRAULIC CONTROL UNIT FOR ROAD EQUIPMENT

Filed March 10, 1948        3 Sheets-Sheet 1

Inventor
George J. Whittey
by Douglas S. Johnson
Agent

March 24, 1953 G. J. WHITTEY 2,632,262
HYDRAULIC CONTROL UNIT FOR ROAD EQUIPMENT
Filed March 10, 1948 3 Sheets-Sheet 2

Inventor
George J. Whittey
by
Douglas S. Johnson
Agent

March 24, 1953 G. J. WHITTEY 2,632,262
HYDRAULIC CONTROL UNIT FOR ROAD EQUIPMENT
Filed March 10, 1948 3 Sheets-Sheet 3
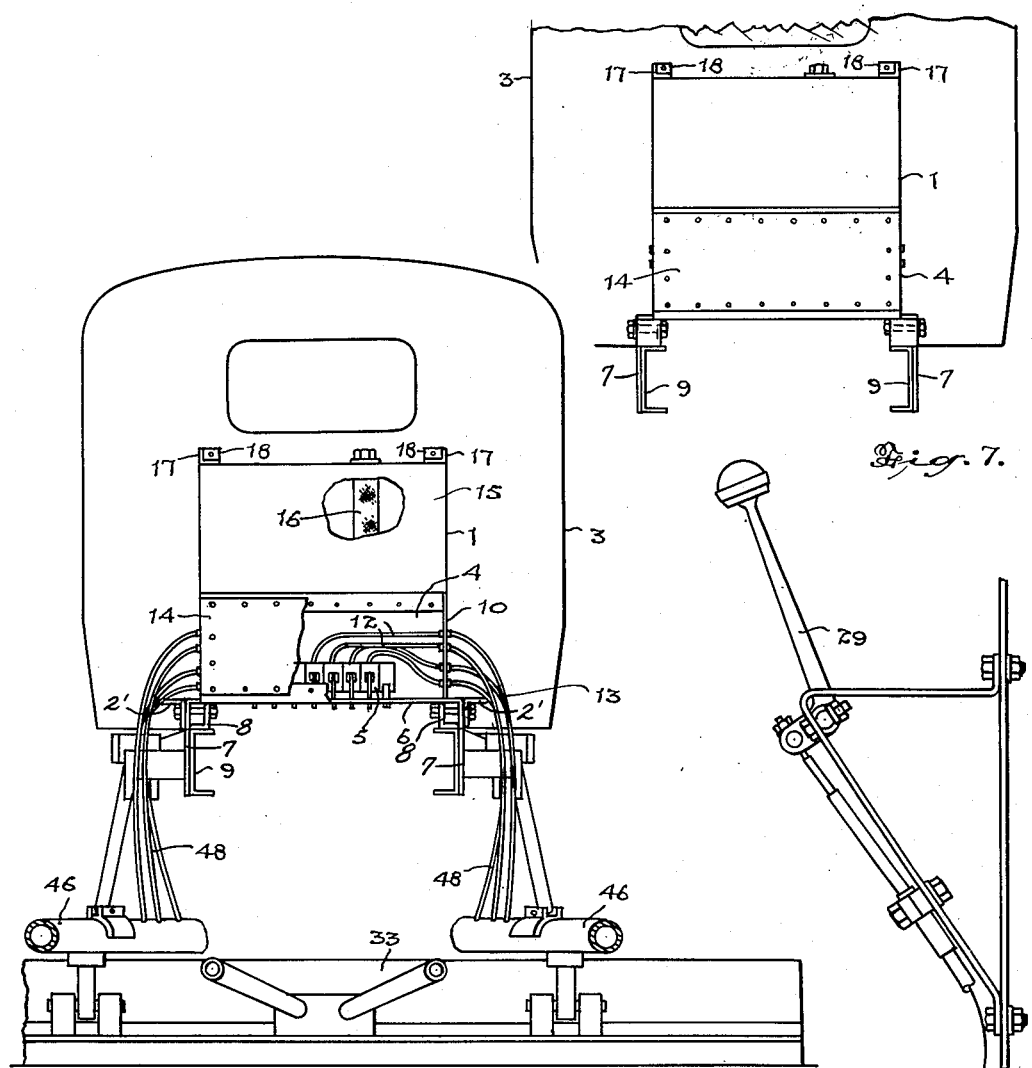
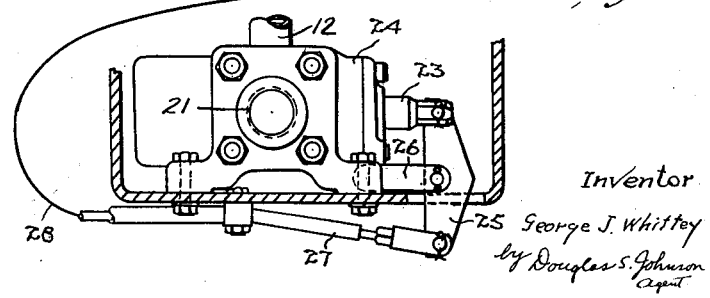
Inventor
George J. Whittey
by Douglas S. Johnson
Agent Patented Mar. 24, 1953

2,632,262

UNITED STATES PATENT OFFICE 2,632,262

HYDRAULIC CONTROL UNIT FOR ROAD EQUIPMENT

George Jones Whittey, Toronto, Ontario, Canada, assignor to Eastern Steel Products Limited, Toronto, Ontario, Canada Application March 10, 1948, Serial No. 13,973

3 Claims. (Cl. 37—42)

This invention relates to the operation and control of truck or vehicle-carried hydraulically operated road and snow plough equipment and the like, and the principal object of the invention is to provide a novel hydraulic control arrangement on a motor vehicle which will permit the removal and interchangement of hydraulically operated equipment, particularly snow plough equipment, to be easily and rapidly carried out with the necessary hydraulic connections being quickly and securely made to the same or "permanent" hydraulic control unit, eliminating the necessity of having individual control units for each piece of equipment, the arrangement thus greatly increasing the flexibility and utility of the vehicle and equipment and greatly reducing operational and maintenance costs presently involved in the operation and interchangement of vehicle-carried hydraulic equipment.

A further important object is to provide a novel form of hydraulic control unit which will serve as a supporting structural member for and greatly facilitate the mounting and removal of hydraulic control towers for operating side or wing type ploughs.

A still further object is to provide a novel hydraulic control arrangement which will enable the vehicle operator to control any of the hydraulic equipment applied to the vehicle from his cab with a single set of control levers.

The principal feature of the invention is the incorporation of a plurality of hydraulic valves in a single hydraulic control unit to be mounted as a "permanent" assembly on the chassis of a truck or vehicle, the valves being connected to a hydraulic pressure source and to hydraulic couplings permanently secured in the walls of the unit, the couplings being readily and detachably coupled with the hydraulic lines of the hydraulic road or plough equipment to be carried by the truck to permit the ready interchangement of equipment, the valves being selectively operable from a control position to control the fluid flow through the lines connected to the hydraulic equipment to operate the equipment.

A further and important feature consists in incorporating the fluid reservoir tank as an integral part of the control unit and mounting the unit in a centralized position to serve as a structural member to facilitate the mounting of and serve as a support for detachable hydraulic control towers for operating wing type ploughs.

A still further feature consists in the novel manner of mounting wing plough hydraulic control towers on the vehicle in conjunction with the hydraulic control unit to permit the ready detachment of the towers and associated ploughs.

Referring to the accompanying drawings, Figure 1 is a perspective view of a truck equipped with my novel "permanent" control unit and illustrating the manner in which the demountable control towers for the wing ploughs are applied to the truck following the removal of the hydraulic road equipment, the left-hand tower being shown secured in position and the right-hand tower being shown ready for movement into position with its flexible hydraulic connections ready for attachment to the control unit couplings.

Figure 4 is an enlarged mid-vertical section through one of the end walls of the control unit housing and the adjacent tower wall showing a suitable type of coupling for connecting the tower hydraulic lines with the control unit.

Figure 5 is a part elevational part sectional view showing in elevation one of the control valves of my unit and illustrating the control mechanism for operating the valve from the truck cab.

Figure 6 is a rear elevational view of the truck equipped with a hydraulic road scraper, the cover plate of my control unit being broken away to show the hydraulic connection between the scraper and control unit.

Figure 7 is a rear elevational view of the truck showing the control unit completely divorced from all equipment.

Under present arrangements now in use the task of interchanging hydraulically operated equipment, particularly wing plough hydraulic control towers, is extremely laborious so that many operators tie up their trucks at the close of the winter season or leave the snow plough equipment on the truck to avoid the expense involved in its removal.

Further when the towers are removed their operating valve banks, which are integral with the towers, are also removed and separate valve controls must be provided for operating the various other hydraulic attachments such as hydraulic road scrapers, graders, rollers and the like.

The present invention has therefore been devised to provide an arrangement which will permit the ready removal of the snow plough equipment and facilitate its interchangement with other equipment, and in addition, eliminate the necessity of separate hydraulic control units for each piece of equipment.

With reference to the drawings, I show my control unit generally designated at 1 as mounted on the chassis of the truck 2 in a centralized position immediately behind the truck cab 3 and defining frame ledges 2' at either end thereof.

Figures 2, 3:
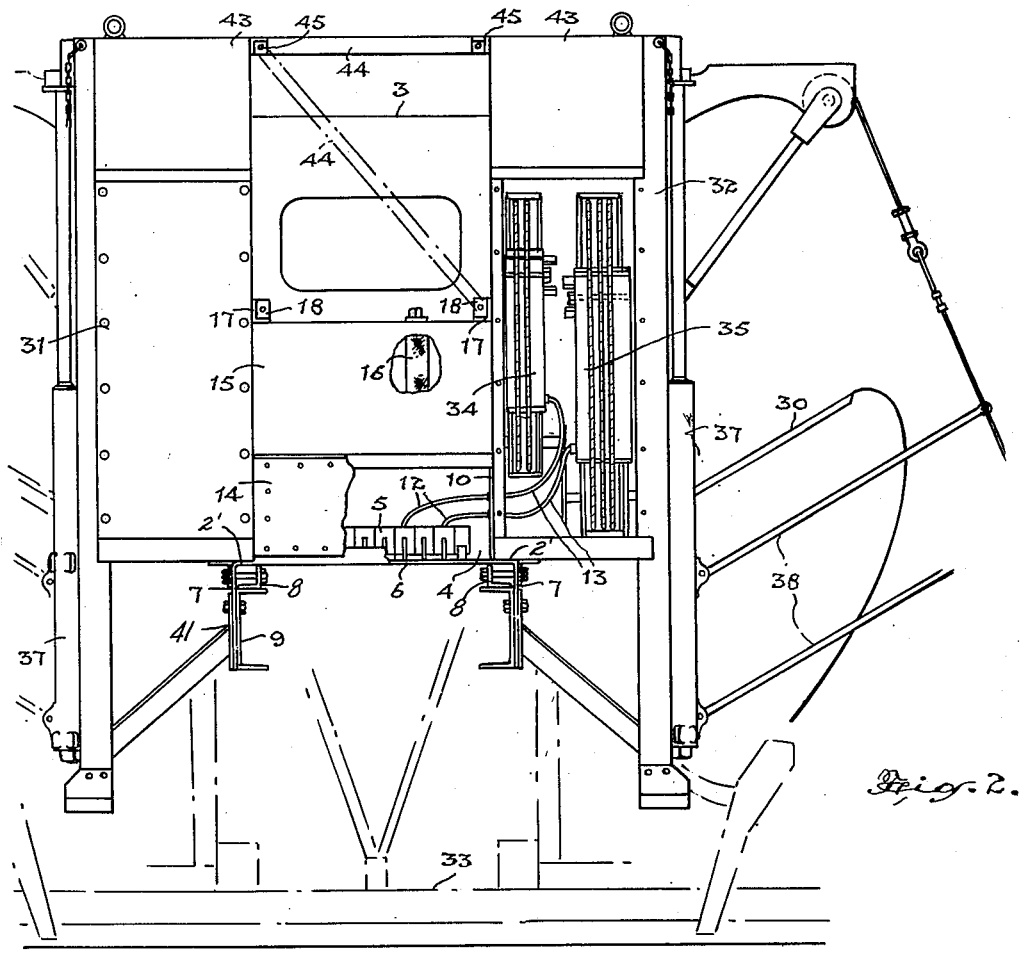
Figure 2 is a rear elevational view of the truck showing the wing plough control towers in position abutting my control unit and showing the cover plate of the unit and right-hand tower broken away illustrating the hydraulic connections therebetween.
Figure 3 is a schematic diagram of the truck's hydraulic circuit showing the arrangement of the control unit valve bank in the oil flow circuits.

The lower compartment or casing section 4 of the unit 1 houses a valve bank 5 which is connected in the oil flow circuit as illustrated diagrammatically in Fig. 3. The bottom 6 of the casing section 4 is formed with right angular depending end flanges 7 which define the ledges 2' and which are reinforced with angle bars 8 arranged at the ends of the section and having the edges of their webs abutting the bottom 6 and flanges 7 respectively.

In securing the unit 1 to the truck, the flanges 7 abut and are secured to the outer faces of the truck chassis members 9 with the bottom webs of the angle bars 8 supported on the upper webs of the truck chassis members. Once the unit is secured in place it need never be removed except for replacement or servicing and therefore can be considered as being "permanently" mounted on the truck.

Permanently secured in the end walls 10 of the casing 4 are a plurality of suitable high pressure hydraulic hose couplings or adaptor unions 11 which are particularly illustrated in Figure 4. These couplings may be of the type shown or may if desired be of the "snap-on" type where the coupling member simply plugs into its opposite member and where the oil flow is automatically sealed off once the connection is broken.

It will be seen particularly on reference to Figure 4 that the couplings 11 project through the end walls 10 and the high pressure hose lines 12 from the valve bank 5 are fastened to these couplings on the inside of the casing section 4, whereas the hydraulic lines 13 from the cylinders of the various pieces of hydraulic equipment to be used in conjunction with the truck are detachably coupled on the outside of the casing section. Thus it will be seen that the end walls 10 of the casing serve as master panels of the control unit.

Closing the rearward face of the casing section 4 is a removable plate 14 which permits access to the valve bank for inspection or servicing and mounted on the top of the lower casing is a rectangular reservoir chamber 15 incorporating an oil filter unit 16.

The ends of the oil reservoir 15 are flush with and form a continuation of the end walls 10 of the lower casing section 4, and mounted on the top of the reservoir at the ends are drilled angle bars 17 provided with drilled inturned ends 18. The casing section 4 and reservoir 15 thus form an integral rigid structural member to facilitate the mounting of the hydraulic control tower assemblies as hereinafter described.

Referring to the oil flow diagram of Figure 3 it will be seen that the oil reservoir 15 is connected to the low pressure side of the hydraulic pump 19 of the truck through the line 20 and to the low pressure side of the valve bank 5 through the line 21, the high pressure line 22 from the pump 19 being connected to the valve bank which in turn is hydraulically connected through the lines 12 to the couplings 11, the valves of the bank 5 being operable to direct high pressure oil to the couplings or to connect the couplings with the reservoir.

Various types of hydraulic valves may of course be employed in the valve bank. The valve I have illustrated in Figure 5 is of the type where the valving is accomplished through a slidable piston 23 operating in a cylinder block 24 and the actuation of the piston is effected through a rock lever 25 pivoted adjacent its centre on the rigid clevis extension 26 and connected at its lower end through a rubber bellows 27 and flexible cable 28 to a control lever 29 mounted in the cab of the truck in a position convenient to the truck operator.

Figure 1:
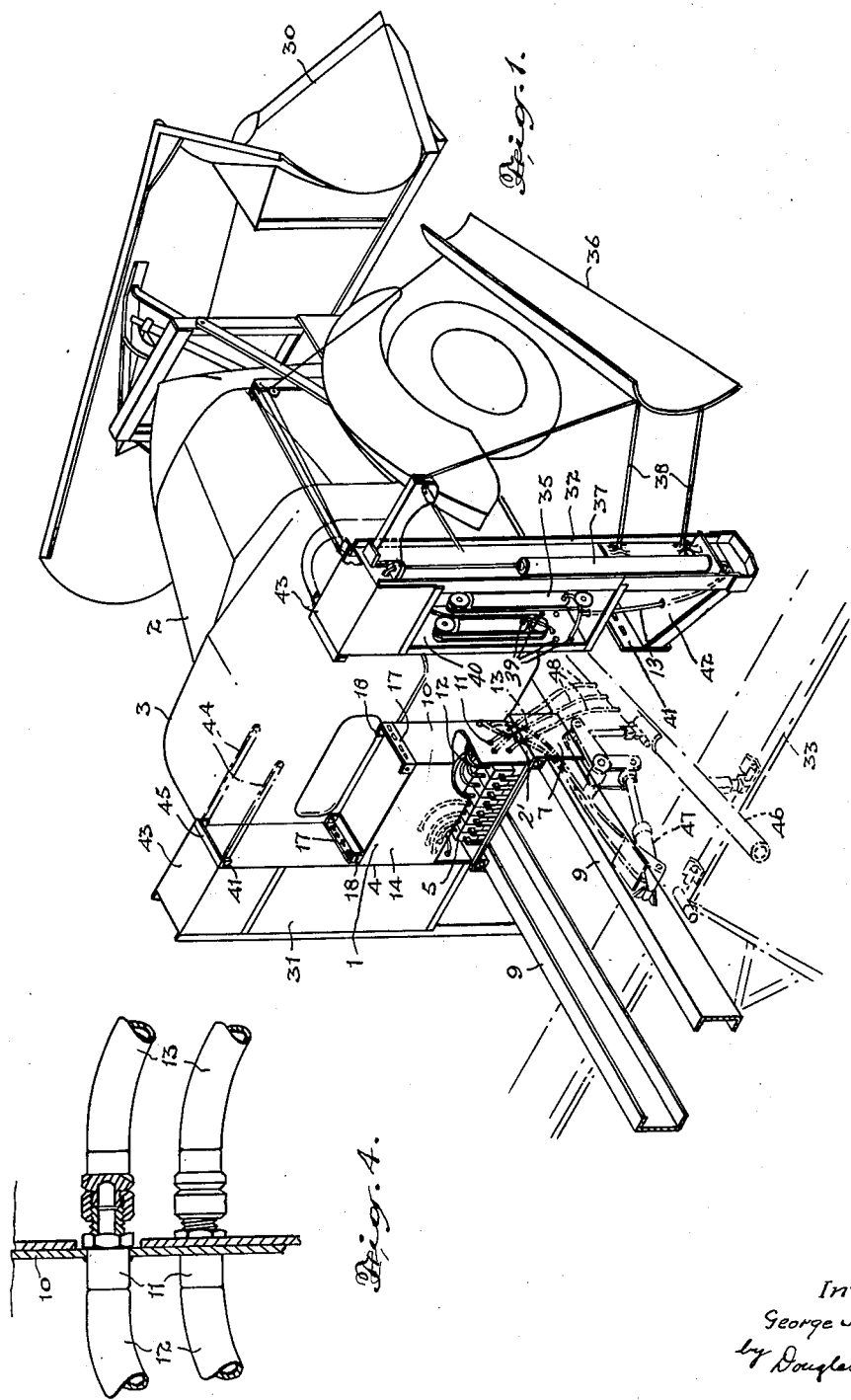

In Figure 1 the truck is shown being fitted with snow plough equipment, the front plough 30 and the left-hand wing plough-operating hydraulic tower assembly 31 having been secured in place. The right-hand hydraulic tower assembly 32 is shown as in position to be mounted on the truck while the scraper assembly 33 shown in dotted outline has just previously been removed.

Tower assemblies generally similar to the tower assemblies disclosed have been previously used for controlling the operation of wing ploughs but these have incorporated their own valve bank or hydraulic control unit which when the tower is removed cannot be utilized with other attachments.

The tower assemblies 31—32 herein disclosed have no associated control valves but the hydraulic cylinders 34 and 35 for controlling the elevation of the wing plough 36 and the vertically movable hydraulic cylinder 37 for maintaining the plough struts 38 in the desired position to resist thrust on the wing 36 all are provided with the flexible high pressure hydraulic hose lines 13 which are instantly and detachably connected to the couplings 11 of the control unit which project through registering openings 39 in the tower wall 40 as clearly shown in Figure 1.

On reference to both Figure 1 and Figure 2, it will be seen that the tower assemblies when in position abut the end walls of the unit 1 with the bottom inner edges of the towers resting on the flanged bottom 6 of the casing 4.

The towers are adapted to be bolted to the drilled angle bars 17 at the top of the oil reservoir 15 while the flanged ends 41 of the tower brackets 42 adjacent the bottoms of the towers are adapted to be bolted to the chassis members 9.

To support the upper ends 43 of the tower assemblies cross or tie bars 44 are secured between the angle bars 45 secured to the towers.

Where only one tower assembly is to be employed the tie bars 44 are connected to the drilled inturned ends 18 of the angle bar 17 remote from the tower as illustrated in dot in Figure 2.

Thus it will be seen that the unit 1 forms a structural member rigidly supporting the tower assemblies eliminating the previous elaborate structural arrangements required for the tower mountings.

It will also be seen that with the above arrangement the towers are readily attachable and demountable and the hydraulic connections can be quickly made to the valve bank 5 enabling the operating hydraulic cylinders to be placed in control of the truck operator through the control levers 29.

When a scraper, grader or other equipment is to be used with the truck it is a simple job to remove the snow plough equipment. The other equipment such as the scraper assembly illustrated in Figures 4 and 6, can then be quickly attached to the truck chassis. The scraper angle controlling hydraulic cylinders 46 and the elevating cylinder 47 are provided with the flexible high pressure hydraulic hose lines 48 which again are instantly and detachably connected to the couplings 11 of the control unit 1 to place the scraper cylinders in control of the truck operator through the control levers 29.

Other forms of hydraulic equipment can of course be used in conjunction with the truck and controlled through the unit 1.

From the foregoing it will therefore be appreciated that in addition to reducing the initial cost of incorporating hydraulic control units in individual hydraulic attachments my permanent control unit will materially reduce the cost of maintenance and interchangement of the truck carried equipment, greatly increasing the flexibility and utility of the truck and equipment.

The importance of this arrangement will be readily understood as it enables small communities and municipalities with limited budgets to efficiently operate a complete line of hydraulic road and snow plow equipment with a truck or other light vehicle.

What I claim as my invention is:

1. In combination with a vehicle having a hydraulic pressure system, a structural supporting member mounted on the vehicle frame, said structural supporting member being in the form of a control unit comprising a rectangular frame centrally located relative to and extending in the direction of the width of said vehicle frame and defining ledges at either end of said rectangular frame, at least one demountable wing plough hydraulic tower assembly including operating cylinders and hydraulic connections therefor detachably mounted on one of said ledges in abutting supported relation with the adjacent end of said rectangular frame over a substantial portion of the height of said tower assembly, means adapted to anchor said tower assembly to said rectangular frame, an oil reservoir contained within said rectangular frame and connected to said vehicle hydraulic pressure system, a plurality of independent valves arranged within said rectangular frame and connected in said pressure system, a plurality of hydraulic couplings firmly mounted in the ends of said rectangular frame and connected to said valves and adapted to detachably couple the hydraulic connections of said hydraulic tower assembly to said hydraulic pressure system through said valves, and means controlling said valves to control hydraulic fluid flow through said couplings and hydraulic connections.

2. In a vehicle carried hydraulically operated snow plough equipment, a demountable wing plough hydraulic tower assembly and a control unit and structural supporting member therefor, said tower assembly comprising an upright frame including plough operating hydraulic cylinders and flexible hydraulic connections therefor, said control unit comprising a rectangular frame structure adapted to be permanently secured centrally of a vehicle frame and having at least one end adapted to be secured to and to support the upright frame of said tower assembly over a substantial portion of the height of said upright frame, said control unit including valves for said tower cylinders and rigidly supported couplings in said end adapted to be secured to said tower assembly, said couplings being adapted for detachably connecting said flexible tower connections to said valves, and means adapted to releasably anchor said upright tower frame to said rectangular control unit frame.

3. In a vehicle carried hydraulically operated snow plough equipment, the combination with a vehicle frame and a vehicle hydraulic pressure system, of a pair of demountable wing plough hydraulic tower assemblies and a control unit and structural supporting member therefor, each of said tower assemblies comprising an upright frame including plough-operating hydraulic cylinders and flexible hydraulic connections therefor, said control unit comprising a rectangular frame structure permanently secured centrally and extending transversely of said vehicle frame and having a length less than the vehicle frame width to define at the ends of the unit horizontal supporting ledges, said unit including valves for said tower cylinders, and rigidly supported couplings mounted at each end of said unit for detachably connecting said flexible tower connections to said valves, said upright tower assemblies adapted to seat on said ledges at opposite ends of and in abutting relation with said rectangular control unit frame, means adapted to detachably anchor said upright tower frames to said vehicle frame below said rectangular control unit frame, detachable bracing means connecting said upright tower frames above said rectangular control unit frame, and releasable means adapted to anchor said upright tower frame to said control unit frame to be supported thereby over a substantial height of said tower frame with said tower flexible connections detachably connected with said control unit couplings.

GEORGE JONES WHITTEY.

REFERENCES CITED

The following references are of record in the file of this patent:

UNITED STATES PATENTS

| Number | Name | Date |
|---|---|---|
| 1,889,269 | Woodbury et al. | Nov. 29, 1932 |
| 2,101,666 | Austin | Dec. 7, 1937 |
| 2,193,532 | Frink | Mar. 12, 1940 |
| 2,341,151 | Maloon | Feb. 8, 1944 |
| 2,402,449 | Rockwell | June 18, 1946 |